United States Patent
Guo et al.

(10) Patent No.: US 12,136,519 B1
(45) Date of Patent: Nov. 5, 2024

(54) LOW INDUCTANCE CAPACITOR WITH ANNULAR DISTRIBUTED CORES

(71) Applicant: Shanghai University of Engineering Science, Shanghai (CN)

(72) Inventors: Hui Guo, Shanghai (CN); Yi Wang, Shanghai (CN); Yansong Wang, Shanghai (CN); Tao Yuan, Shanghai (CN); Ningning Liu, Shanghai (CN); Pei Sun, Shanghai (CN); Xinhua Guo, Shanghai (CN); Chi Xu, Shanghai (CN); Shuang Huang, Shanghai (CN); Xipei Ma, Shanghai (CN); Chao Yang, Shanghai (CN); Minghui Ma, Shanghai (CN); Lifeng Ma, Shanghai (CN)

(73) Assignee: SHANGHAI UNIVERSITY OF ENGINEERING SCIENCE, Shanghai (CN)

( * ) Notice: Subject to any disclaimer, the term of this patent is extended or adjusted under 35 U.S.C. 154(b) by 0 days.

(21) Appl. No.: 18/759,071

(22) Filed: Jun. 28, 2024

(30) Foreign Application Priority Data

Aug. 10, 2023 (CN) .......................... 202311002047.7

(51) Int. Cl.
*H01G 4/228* (2006.01)
*H01G 2/08* (2006.01)
*H01G 4/224* (2006.01)
*H01G 4/38* (2006.01)

(52) U.S. Cl.
CPC .............. *H01G 4/228* (2013.01); *H01G 2/08* (2013.01); *H01G 4/224* (2013.01); *H01G 4/38* (2013.01)

(58) Field of Classification Search
None
See application file for complete search history.

(56) References Cited

U.S. PATENT DOCUMENTS

2023/0187135 A1* 6/2023 Paesler ................. H01G 11/08
361/306.1

FOREIGN PATENT DOCUMENTS

| CN | 105679536 | A |   | 6/2016 |
|----|-----------|---|---|--------|
| CN | 107293406 | A |   | 10/2017 |
| CN | 107507706 | A | * | 12/2017 |
| CN | 212136270 | U | * | 12/2020 |
| CN | 112260608 | A |   | 1/2021 |

(Continued)

OTHER PUBLICATIONS

SIPO Search report in application No. 202311002047.7 dated Jan. 10, 2024.

(Continued)

*Primary Examiner* — Dion R. Ferguson
(74) *Attorney, Agent, or Firm* — Piloff Passino & Cosenza, LLP; Rachel Piloff; Sean Passino (57) ABSTRACT

A low inductance capacitor with annular distributed cores is provided, which relates to the technical field of capacitors, and includes a lower bus bar, capacitor cores and an upper bus bar. Currents accessed from lower connection terminals flow to a closed end of the lower bus bar along copper bar connecting plates, and flow to the upper bus bar through the capacitor cores, and then flow out from upper connection terminals to form a loop. And positions of the copper bar connecting plates are in one-to-one correspondence with positions of the capacitor cores, and flow directions of the currents are opposite.

5 Claims, 8 Drawing Sheets

(56) References Cited

FOREIGN PATENT DOCUMENTS

| CN | 212365749 U | * | 1/2021 | | |
|---|---|---|---|---|---|
| CN | 113496822 A | * | 10/2021 | | |
| CN | 216980352 U | | 7/2022 | | |
| CN | 114883111 A | | 8/2022 | | |
| CN | 116798773 A | * | 9/2023 | ............. | H01F 27/29 |
| CN | 116798773 B | * | 3/2024 | ............. | H01F 27/29 |
| DE | 102020206364 A1 | | 11/2021 | | |

OTHER PUBLICATIONS

SIPO Search report in application No. 202311002047.7 dated Mar. 5, 2024.
Huang Linhao, et al., Simulation analysis of thermal-electric coupling and heat dissipation characteristics of vehicle DC-bus capacitor, Electronic Components and Materials, vol. 42, No. 8. Date of issue: Aug. 31, 2023 Full text Related claims: 1-5.
SIPO office action in application No. 202311002047.7 dated Jan. 15, 2024.

* cited by examiner

LOW INDUCTANCE CAPACITOR WITH ANNULAR DISTRIBUTED CORES

CROSS-REFERENCE TO RELATED APPLICATIONS

This disclosure claims priority to Chinese Patent Application No. 202311002047.7, filed on Aug. 10, 2023, the entire contents of which are incorporated herein by reference.

TECHNICAL FIELD

The disclosure relates to the technical field of capacitors, in particular to a low inductance capacitor with annular distributed cores.

BACKGROUND

Stray inductance will be generated when the capacitor in the drive motor controller of new energy vehicle works. Stray inductance may lead to instability or fluctuation of the voltage at both ends of the capacitor, which may interfere with the normal operation of the circuit. Due to the existence of stray inductance, the response time of capacitor to circuit change will be extended. Inductive elements may restrain the change speed of current, so the charging and discharging process of capacitor may become slower, thereby affecting the response time of the circuit. The interaction among stray inductance and the capacitor and other inductance elements may lead to resonance or oscillation. At present, in order to adapt to the drive motor controller with higher power density and higher working frequency, reducing stray inductance of the capacitor has become an urgent problem to be solved.

The existing method applied to conventional square capacitors for reducing stray inductance is to make bus bars at both ends of the core form opposite current circuits by using the principle of topological cancellation, but the effect is limited. Moreover, in this structure, the stacking of multiple cores may lead to temperature concentration, which will have a certain impact on the performance of the capacitor. However, for the existing circular capacitors, there are also problems of large volume and limited effect of reducing stray inductance.

SUMMARY

An objective of the disclosure is to provide a low inductance capacitor with annular distributed cores, so as to solve the problems existing in the prior art, and realize the reduction of stray inductance of the capacitor and the uniform distribution of temperature on the basis of almost constant volume.

In order to achieve the above objective, the disclosure provides a following scheme: the disclosure provides a low inductance capacitor with annular distributed cores, including:

a lower bus bar, where the lower bus bar is arranged in a cylindrical structure with an open end, and a peripheral surface of the lower bus bar is provided with multiple openings at equal intervals in a circumferential direction, and an outer peripheral surface of the lower bus bar is divided into multiple copper bar connecting plates, and an outer wall of the open end of the lower bus bar is provided with lower connection terminals;

where multiple capacitor cores are arranged at equal intervals in the circumferential direction inside the lower bus bar, where the multiple capacitor cores are arranged in one-to-one correspondence with the multiple copper bar connecting plates, and one end of each of the multiple capacitor cores abuts against a closed end of the lower bus bar; and an upper bus bar, where a side surface of the upper bus bar abuts against another end of each of the multiple capacitor cores, and a peripheral surface of the upper bus bar is provided with upper connection terminals;

currents accessed from the lower connection terminals flow to the closed end of the lower bus bar along the copper bar connecting plates, and flow to the upper bus bar through the capacitor cores, and then flow out from the upper connection terminals to form a loop, where positions of the multiple copper bar connecting plates are in one-to-one correspondence with positions of the multiple capacitor cores, and flow directions of the currents flow are opposite.

Optionally, the side surface of the upper bus bar is provided with a stepped circular frustum, and the stepped circular frustum abuts against the other end of each of the multiple capacitor cores, and a gap is left between the upper connection terminals and the lower connection terminals through the stepped circular frustum.

Optionally, the lower bus bar, the upper bus bar and the multiple capacitor cores are fixed in a shell through a filler, and an inner wall of the shell is separated from an outer wall of the lower bus bar through the filler.

Optionally, one end of the shell is set as an open end, and a notch is formed on an outer wall of the open end of the shell, and the upper connection terminals and the lower connection terminals protrude from the notch.

Optionally, two opposite side surfaces of the shell are respectively set as sectional structures, and two ends of a bottom of the shell are respectively fixedly connected with fixing ends, and the fixing ends are fixedly connected in a motor controller through bolts.

Optionally, at least one capacitor core is further arranged in a ring structure surrounded by the multiple capacitor cores, and the one end of each of the capacitor cores abuts against the closed end of the lower bus bar, and the other end of each of the capacitor cores abuts against the stepped circular frustum.

Optionally, the shell is made of polyphenylene sulfide material.

Optionally, the filler is made of epoxy resin material.

The disclosure discloses following technical effects.

Firstly, the disclosure adjusts flow directions of currents by changing structures of the lower bus bar and the upper bus bar, so that the current of the lower bus bar and the current of the capacitor core form opposite current loops, the effect of reducing stray inductance is achieved.

Secondly, the circular arrangement of the capacitor cores in the disclosure can achieve the effect of reducing stray inductance and effectively reduce the volume.

Thirdly, according to the disclosure, the multiple copper bar connecting plates on the lower bus bar adopt a one-to-one correspondence relationship with the multiple capacitor cores in a ring structure, and the rest parts of the lower bus bar are all perforated, so that the structure has good heat dissipation effect and relatively uniform internal temperature distribution on the basis of considering stray inductance.

BRIEF DESCRIPTION OF THE DRAWINGS

In order to explain the embodiments of the disclosure or the technical scheme in the prior art more clearly, the drawings needed in the embodiments will be briefly introduced below. Obviously, the drawings described below are only some embodiments of the disclosure, and other drawings may be obtained according to these drawings without creative effort for those of ordinary skill in the art.

DETAILED DESCRIPTION OF THE EMBODIMENTS

In the following, the technical scheme in the embodiment of the disclosure will be clearly and completely described with reference to the attached drawings. Obviously, the described embodiment is only a part of the embodiments of the disclosure, but not all of the embodiments. Based on the embodiments in the disclosure, all other embodiments obtained by those of ordinary skill in the art without creative effort belong to the protection scope of the disclosure.

In order to make the above objectives, features and advantages of the disclosure more apparent and understandable, the disclosure will be further described in detail with the attached drawings and specific embodiments.

With reference to FIG. 1 to FIG. 8, the disclosure provides a low inductance capacitor with annular distributed cores, which includes a lower bus bar 1 and an upper bus bar 5.

Figure 1:
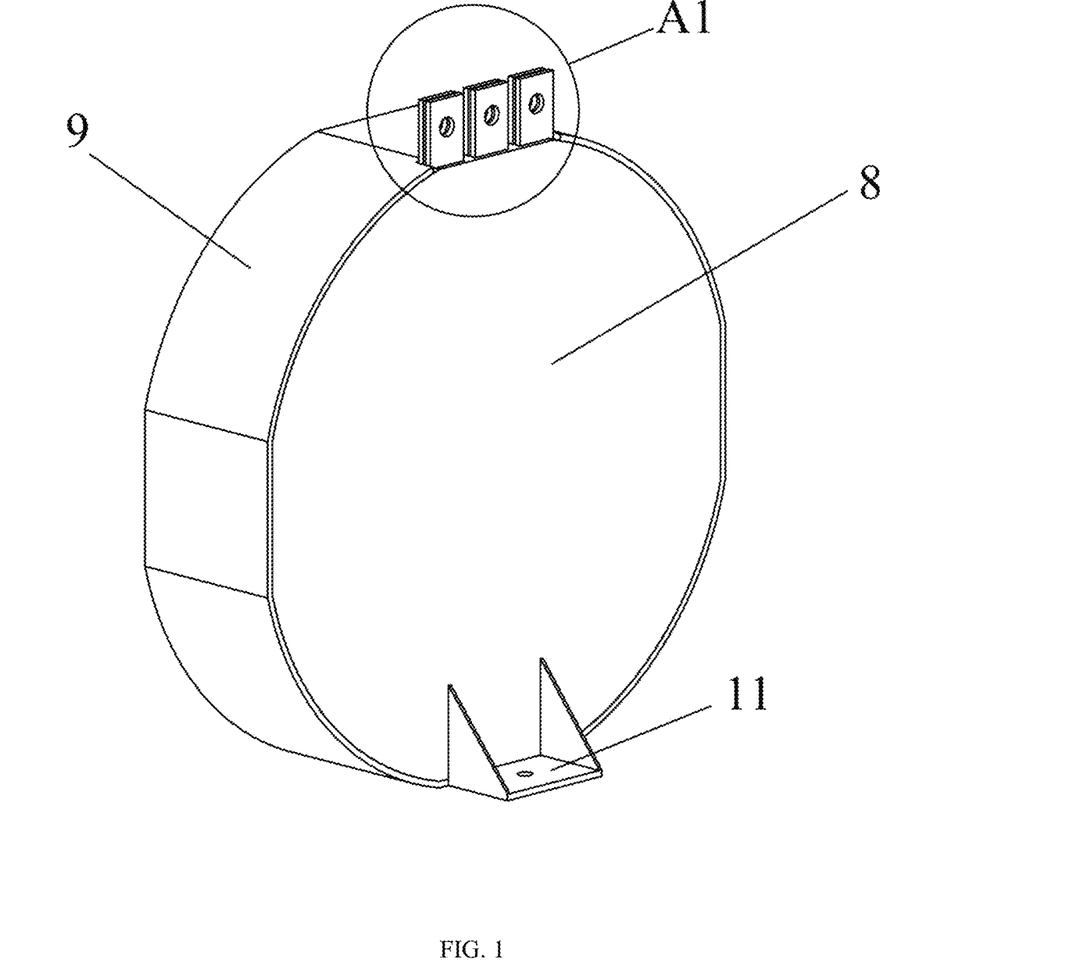
FIG. 1 is a schematic structural diagram of a low inductance capacitor with annular distributed cores according to the disclosure.
Figure 2:
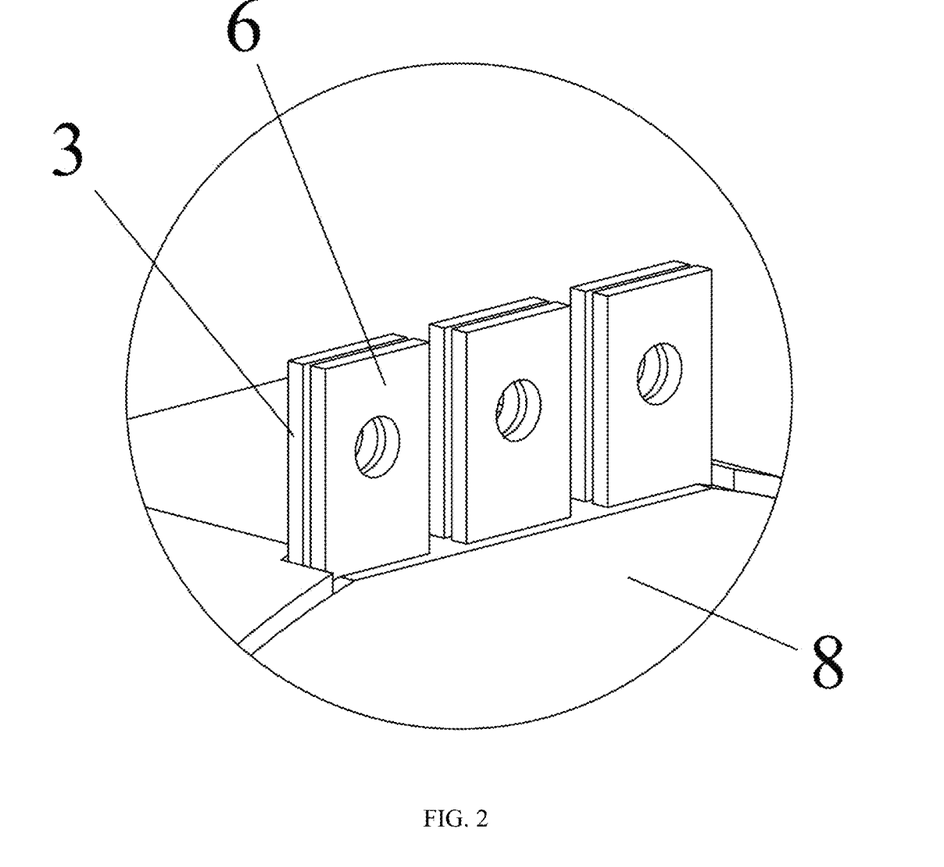
FIG. 2 is a partial enlarged view of A1 in FIG. 1.
Figure 5:
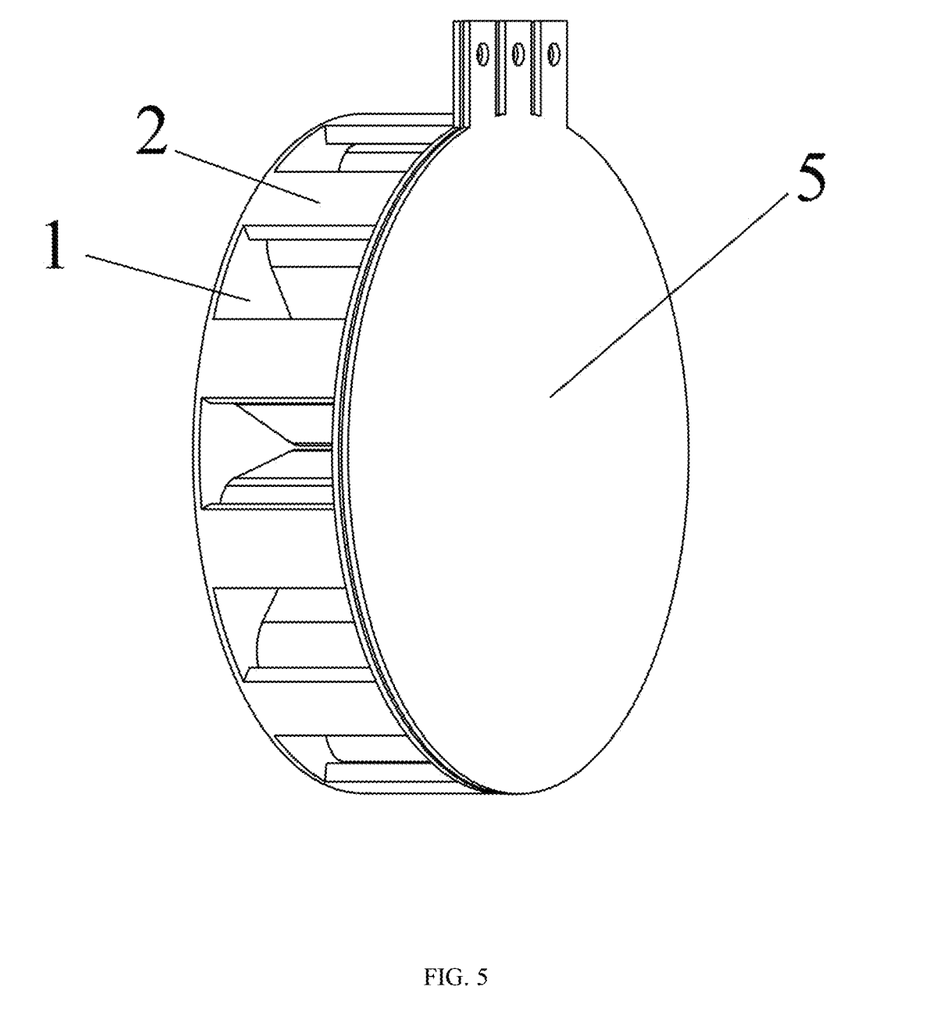
FIG. 5 is a schematic diagram of an assembly structure of an upper bus bar and a lower bus bar according to the disclosure.
Figure 6:
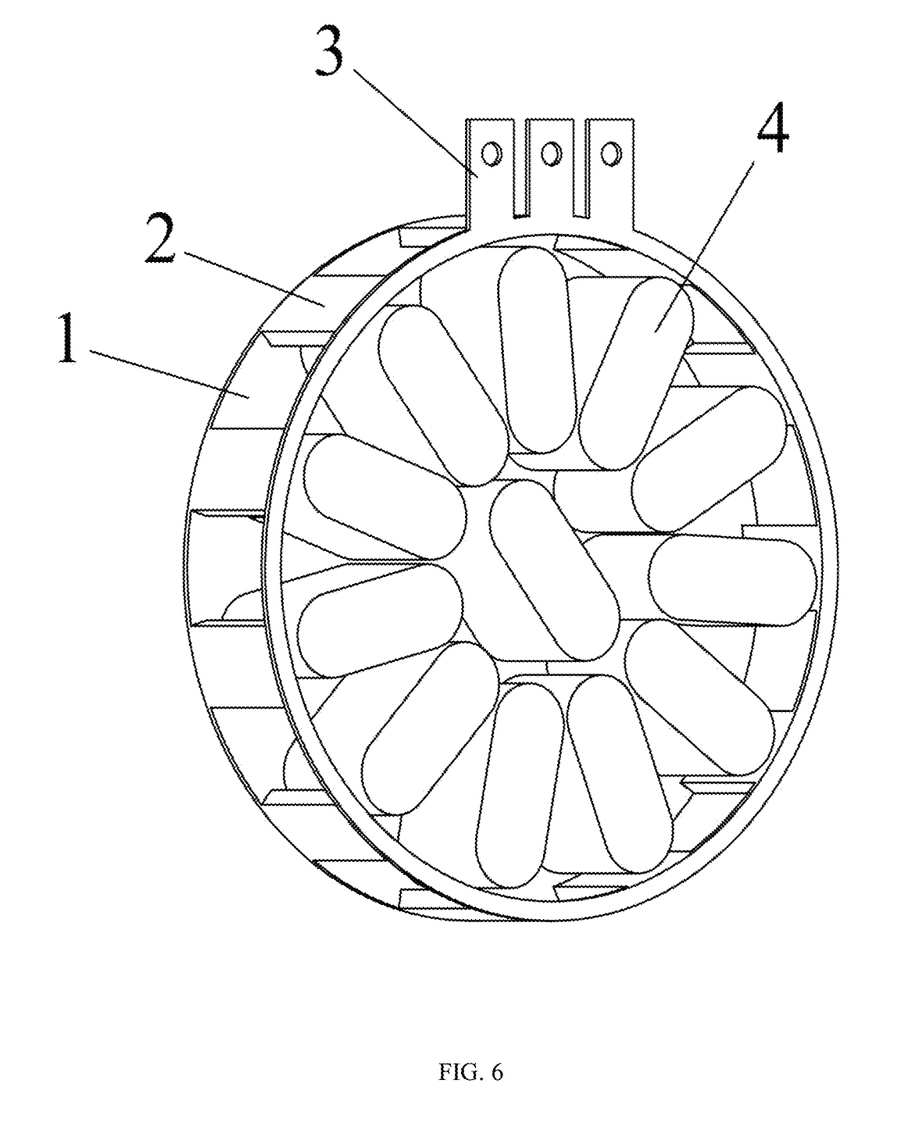
FIG. 6 is a schematic diagram of an arrangement of capacitor cores in the lower bus bar according to the disclosure.

The lower bus bar 1 is arranged in a cylindrical structure with an open end, and a peripheral surface of the lower bus bar 1 is provided with multiple openings at equal intervals in a circumferential direction, and the peripheral surface of the lower bus bar 1 is divided into multiple copper bar connecting plates 2, and the arranged opening structure may effectively play a role in radiating heat. And an outer wall of the open end of the lower bus bar 1 is provided with lower connection terminals 3.

Multiple capacitor cores 4 are arranged at equal intervals in the circumferential direction inside the lower bus bar 1, where the multiple capacitor cores 4 are arranged in one-to-one correspondence with the multiple copper bar connecting plates 2, and one end of each of the multiple capacitor cores 4 abuts against a closed end of the lower bus bar 1.

Figure 7:
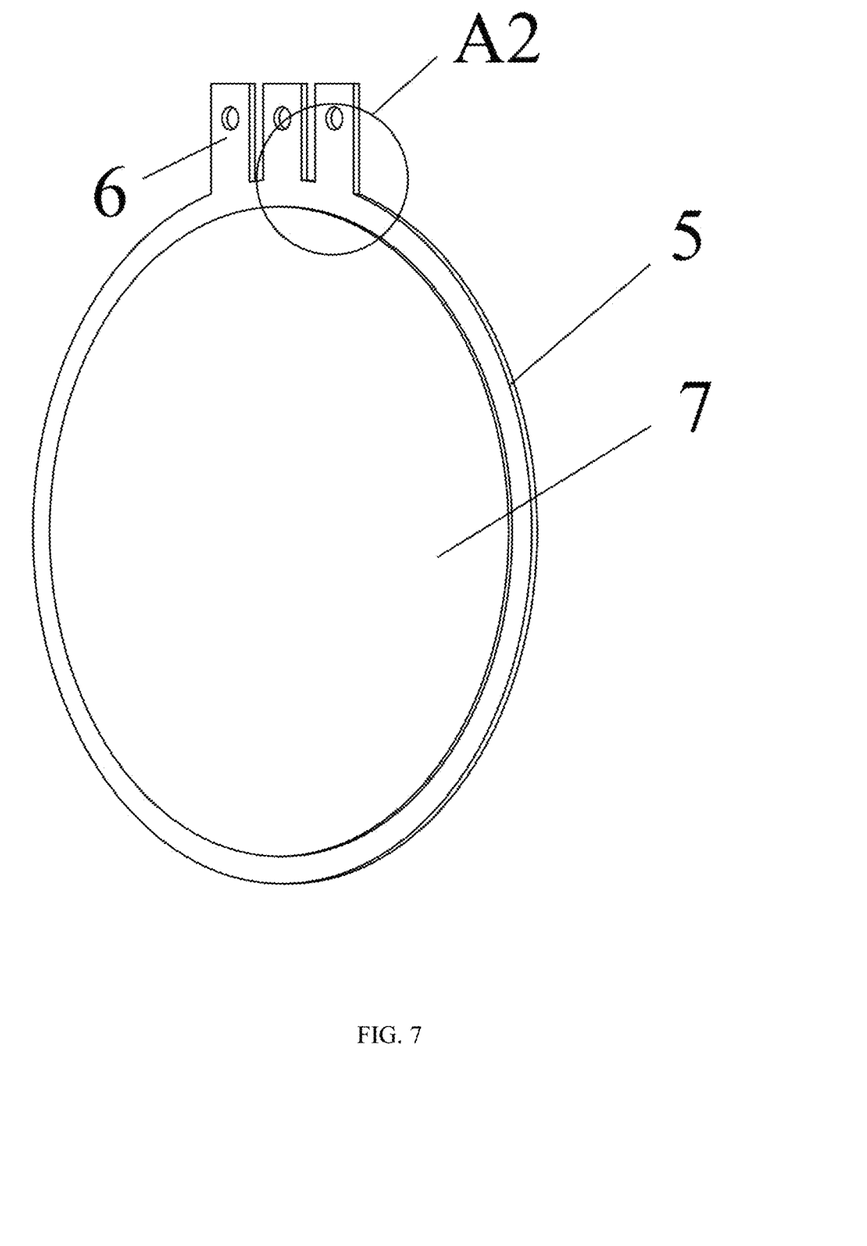
FIG. 7 is a schematic structural diagram of the upper bus bar according to the disclosure.
Figure 8:
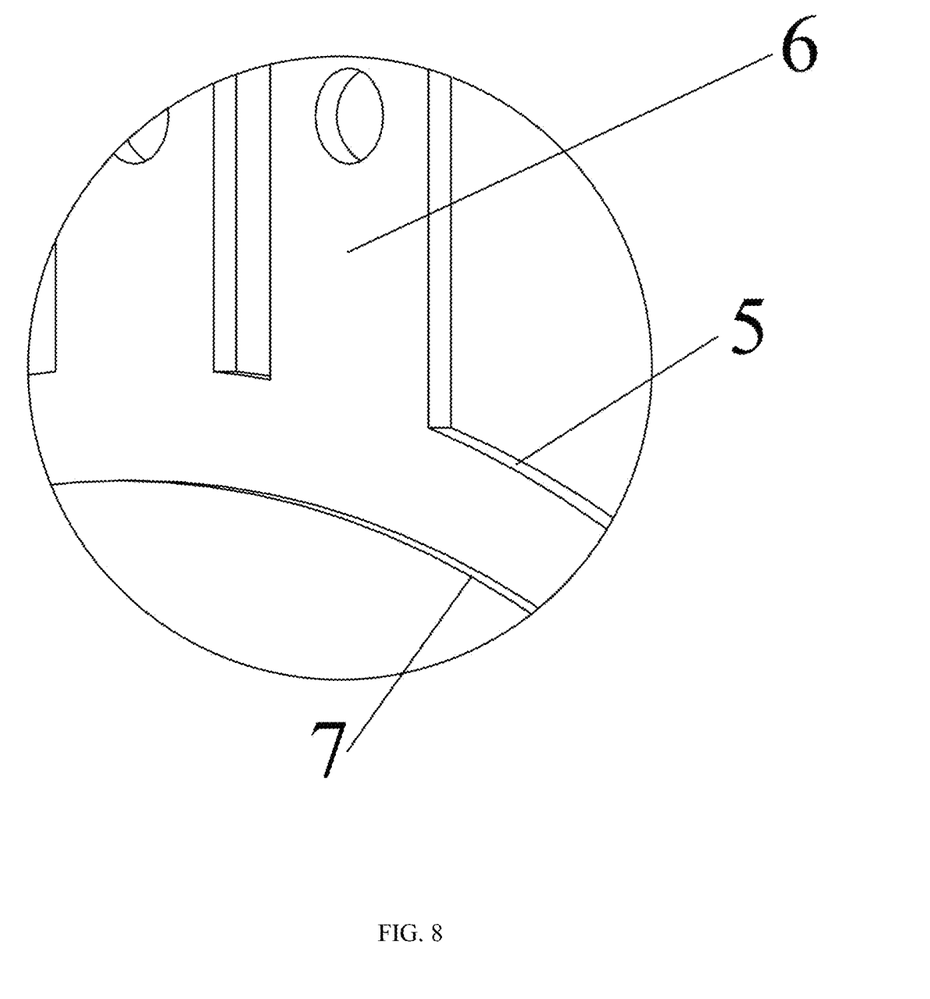
FIG. 8 is a partial enlarged view of A2 in FIG. 2.

A side surface of the upper bus bar 5 abuts against another end of each of the multiple capacitor cores 4, and a peripheral surface of the upper bus bar 5 is provided with upper connection terminals 6.

Currents accessed from the lower connection terminals 3 flow to the closed end of the lower bus bar 1 along the copper bar connecting plates 2, and flow to the upper bus bar 5 through the capacitor cores 4, and then flow out from the upper connection terminals 6 to form a loop. Positions of the multiple copper bar connecting plates 2 correspond to positions of the multiple capacitor cores 4 one by one, and the flow directions of the currents are opposite, thereby forming the magnetic cancellation design loop of topological circuit. When two currents are in opposite directions, two adjacent opposite current loops generate magnetic cancellation based on a principle of mutual inductance, thereby achieving the purpose of reducing inductance. This structure will effectively reduce stray inductance.

In an embodiment, the side surface of the upper bus bar 5 is provided with a stepped circular frustum 7 with a thickness of 1 mm, and the stepped circular frustum 7 abuts against the other end of each of the capacitor cores 4, and a gap is provided between the upper connection terminals 6 and the lower connection terminals 3 through the stepped circular frustum 7.

Figure 4:
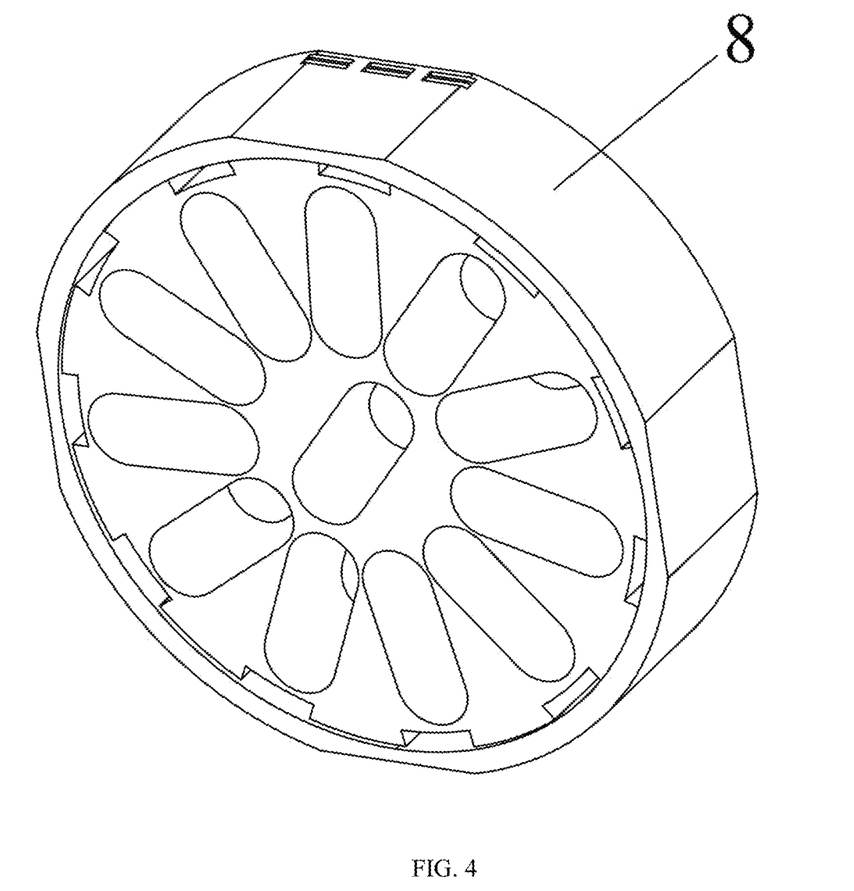
FIG. 4 is a schematic structural diagram of a filler according to the disclosure.

In an embodiment, the lower bus bar 1, the upper bus bar 5 and the multiple capacitor cores 4 are fixed in the shell 9 through a filler 8, and an inner wall of the shell 9 is separated from an outer wall of the lower bus bar 1 through the filler 8, so that direct contact between the lower bus bar 1 and the shell 9 may be avoided.

Figure 3:
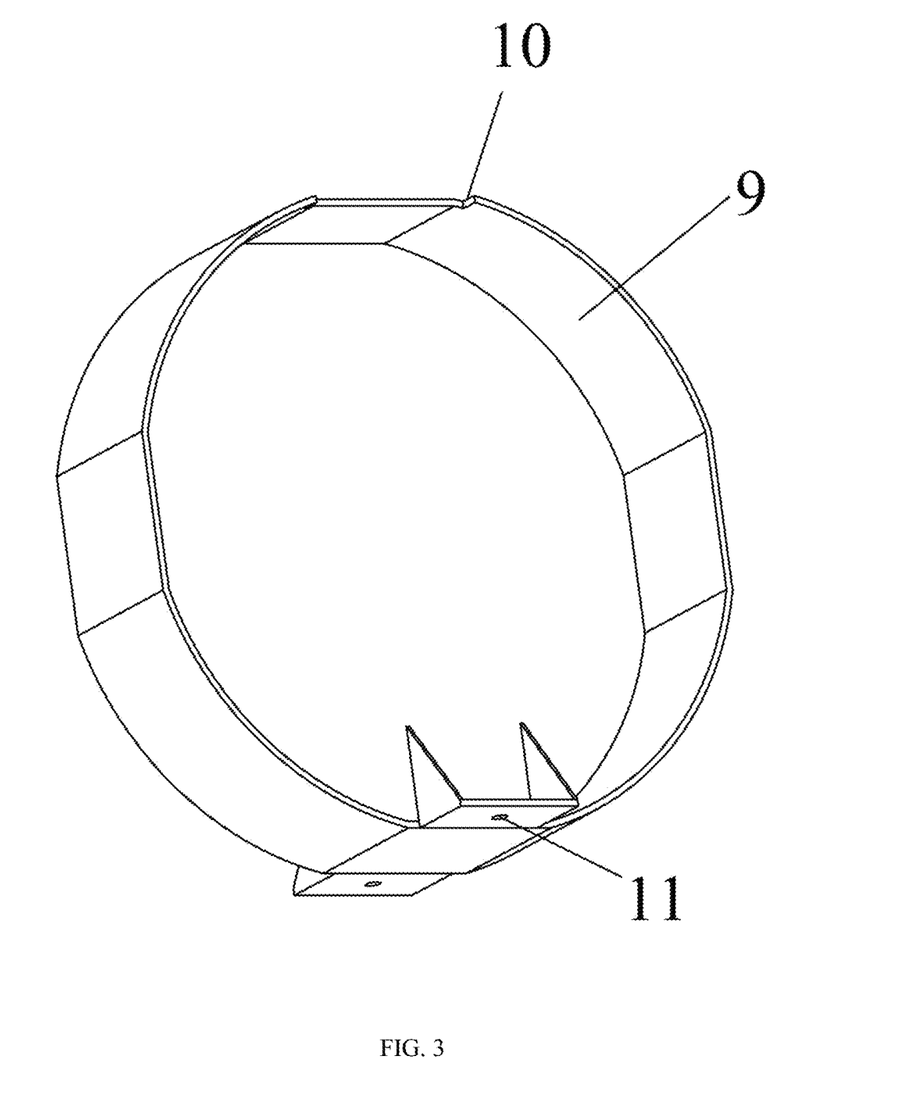
FIG. 3 is a schematic structural diagram of a shell according to the disclosure.

In an embodiment, one end of the shell 9 is set as an open end, and a notch 10 is formed on an outer wall of the open end of the shell 9, and the upper connection terminals 6 and the lower connection terminals 3 protrude from the notch 10.

The notch 10 may be processed by laser cutting, stamping and other processes.

In an embodiment, two pair of opposite side surfaces of the shell 9 are respectively set as sectional structures to facilitate stable placement, and two ends of a bottom of the shell 9 are respectively fixedly connected with fixing ends 11. Each of the fixing ends 11 is set as a triangular structure, a threaded hole is reserved on each of the fixing ends 11, and then the fixing ends 11 are fixedly connected in a motor controller through bolts.

In an embodiment, at least one capacitor core 4 is also arranged in a ring structure surrounded by the multiple capacitor cores 4, and one end of each of the capacitor cores 4 abuts against the closed end of the lower bus bar 1, and the other end of each of the capacitor cores 4 abuts against the stepped circular frustum 7.

Arranging the multiple capacitor cores 4 in the ring structure may effectively reduce an overall volume. The arranged capacitor cores 4 are polypropylene film capacitors.

The capacitor cores 4 in the disclosure adopts the design of 11 groups outside and 1 group inside, thus further reducing stray inductance, and it is an optimal solution considering inductance and volume.

In an embodiment, the shell 9 is made of polyphenylene sulfide material.

In an embodiment, the filler 8 is made of epoxy resin material.

A packaging process of the disclosure is as follows.

Firstly, the upper bus bar 5 and the lower bus bar 1 are assembled with the capacitor cores 4.

Secondly, after completing the above assembly, the whole body is assembled with the inner wall of the shell 9.

Thirdly, the filler 8 is poured into and seals the inside of the shell 9.

Take loading 12 capacitor cores 4 as an example.

The disclosure may use ANSYS Q3D software to extract stray inductance from a model. At a frequency of 1 megahertz (MHZ), an inductance of an original 12-core square capacitor is 6.494 nH. The steady-state thermal coupling simulation of the model is carried out by ANSYS FLUENT software. A ripple current rating of an original direct current bus capacitor is 180 ampere (A), and a convective heat transfer coefficient is 5 watt/square meter-° C. (W/m²-° C.). When an ambient temperature is 25° C., a highest temperature of the capacitor is 64.030° C., and the maximum temperature is concentrated inside the capacitor cores 4.

Under the same conditions, an inductance of the low inductance capacitor with the annular distributed cores according to the disclosure is 3.571 nH, a highest temperature of the capacitor is 53.582° C., and the temperature distribution is uniform. The stray of the capacitor is greatly reduced and the high temperature resistance of the capacitor is improved, which is beneficial to improve the performance of the capacitor and prolong the service life of the capacitor, and provides certain reference value for reducing the stray inductance of the capacitor and designing the heat dissipation structure of the capacitor.

In the description of the disclosure, it should be understood that terms "longitudinal", "transverse", "up", "down", "front", "back", "left", "right", "vertical", "horizontal", "top", "bottom", "inside", "outside", etc. indicate that the orientation or positional relationships are based on the orientation or positional relationships shown in the drawings, only for the convenience of describing the disclosure, rather than indicating or implying that the device or element referred to must have a specific orientation, be constructed and operated in a specific orientation. Therefore, it may not be understood as a limitation of the disclosure.

The above-mentioned embodiments only describe the preferred embodiments of the disclosure, and do not limit the scope of the disclosure. Under the premise of not departing from the design spirit of the disclosure, various modifications and improvements made by those of ordinary skill in the art to the technical solution of the disclosure shall fall within the protection scope determined by the claims of the disclosure.

What is claimed is:

1. A low inductance capacitor with annular distributed cores, comprising:
    a lower bus bar, wherein the lower bus bar is arranged in a cylindrical structure with an open end, and a peripheral surface of the lower bus bar is provided with a plurality of openings at equal intervals in a circumferential direction, and an outer peripheral surface of the lower bus bar is divided into a plurality of copper bar connecting plates, and an outer wall of the open end of the lower bus bar is provided with lower connection terminals;
    wherein a plurality of capacitor cores are arranged at equal intervals in the circumferential direction inside the lower bus bar, and the plurality of capacitor cores are arranged in one-to-one correspondence with the plurality of copper bar connecting plates, and one end of each of the plurality of capacitor cores abuts against a closed end of the lower bus bar; and
    an upper bus bar, wherein a side surface of the upper bus bar abuts against an other end of each of the plurality of capacitor cores, and a peripheral surface of the upper bus bar is provided with upper connection terminals;
    wherein currents accessed from the lower connection terminals flow to the closed end of the lower bus bar along the copper bar connecting plates, and flow to the upper bus bar through the capacitor cores, and then flow out from the upper connection terminals to form a loop; wherein positions of the plurality of copper bar connecting plates are in one-to-one correspondence with positions of the plurality of capacitor cores, and flow directions of the currents are opposite;
    wherein one side surface of the upper bus bar is provided with a stepped circular frustum, and the stepped circular frustum abuts against the other end of each of the plurality of capacitor cores, and a gap is left between the upper connection terminals and the lower connection terminals through the stepped circular frustum;
    wherein the lower bus bar, the upper bus bar and the plurality of capacitor cores are fixed in a shell through a filler, and an inner wall of the shell is separated from an outer wall of the lower bus bar through the filler; and
    wherein one end of the shell is set as an open end, and a notch is formed on an outer wall of the open end of the shell, and the upper connection terminals and the lower connection terminals protrude from the notch.

2. The low inductance capacitor with annular distributed cores according to claim 1, wherein two opposite side surfaces of the shell are respectively set as sectional structures, and two ends of a bottom of the shell are respectively fixedly connected with fixing ends, and the fixing ends are fixedly connected in a motor controller through bolts.

3. The low inductance capacitor with annular distributed cores according to claim 2, wherein at least one capacitor core is further arranged in a ring structure surrounded by the plurality of capacitor cores, and the one end of each of the capacitor cores abuts against the closed end of the lower bus bar, and the other end of each of the capacitor cores abuts against the stepped circular frustum.

4. The low inductance capacitor with annular distributed cores according to claim 3, wherein the shell is made of polyphenylene sulfide material.

5. The low inductance capacitor with annular distributed cores according to claim 4, wherein the filler is made of epoxy resin material.

* * * * *